United States Patent Office 2,847,391
Patented Aug. 12, 1958

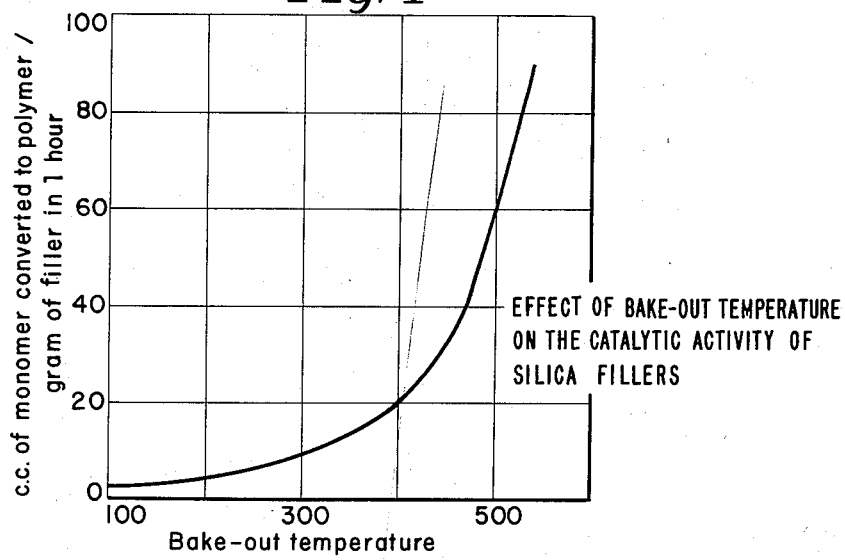
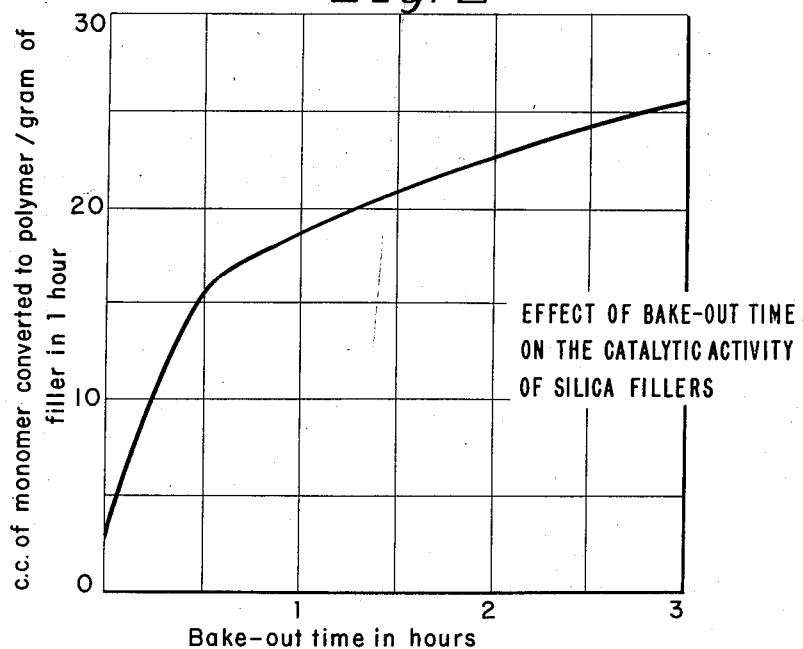

2,847,391

VAPOR-PHASE POLYMERIZATION OF TETRA-FLUOROETHYLENE IN THE PRESENCE OF FILLERS

Ahlborn Wheeler, Arden, Del., assignor to E. I. du Pont de Nemours and Company, Wilmington, Del., a corporation of Delaware Application February 24, 1955, Serial No. 490,198

15 Claims. (Cl. 260—41)

This invention relates to the polymerization of tetrafluoroethylene at moderate temperatures and pressures, and more particularly to the polymerization of tetrafluoroethylene in the presence of particular fillers which also act as catalysts.

Silica particles have found wide applications in chemical reactions as catalysts, catalyst carriers, and adsorption agents. Thus silica gels have been used as catalysts for the condensation of unsaturated hydrocarbons with phenols, the condensation of aldehydes with urea, the condensation of ethylene with ammonia; silica gels and related silica-containing materials have been used in bromination and chlorination reactions. In addition silica gels have been used as carriers for catalysts in polymerizations of ethylene, butylene, propylene and the like to gasolines, oils, and other low molecular weight polymers. The catalysts used in such reactions are phosphoric acids, metal salts and borotrifluoride among others. The use of silica is well described in the book "Catalysts" by Berkman, Morrell and Egloff issued in 1940. The use of silica gels and other forms of hydrated silica, in the absence of any other catalyst, to give high molecular weight fluorocarbon polymers, however, is believed to be novel.

Tetrafluoroethylene was first polymerized by Plunkett as described and claimed in U. S. Patent 2,230,654. Since then many processes have been discovered by which tetrafluoroethylene is polymerized to a high molecular weight polymer. Early in the development of polytetrafluoroethylene it was discovered that certain properties of the molded polymer are enhanced by the addition of solid fillers. The addition of solid fillers, such as silica has been described in U. S. patents such as 2,392,388, 2,400,099, and 2,400,091, where the filler is added in a powdered form. U. S. Patent 2,393,967 discloses the preparation of finely divided polymer of tetrafluoroethylene by a dispersion method and further discloses the addition of finely divided solids to the dispersion which serve as fillers for the polymer. These techniques of obtaining filled compositions of polytetrafluoroethylene however have the disadvantage of adding an additional processing step. A further disadvantage in some cases is that the compositions obtained are often not homogeneous and that the filler is exposed to the surface of the molded article.

It is therefore the object of this invention to obtain filled compositions of tetrafluoroethylene polymer. A further object of this invention is to polymerize the tetrafluoroethylene directly on to the filler. Yet another object of this invention is to provide an atmospheric pressure, room temperature polymerization process for tetrafluoroethylene. Still another object of this invention is the use of fillers which can act as polymerization catalysts. A further object is to obtain homogeneous mixtures of polymer and filler. Still another object is to polymerize tetrafluoroethylene to a high molecular weight polymer. Yet a further object is to obtain a polytetrafluoroethylene molding powder with improved properties.

These and other objects are accomplished by the vapor phase polymerization of tetrafluoroethylene in a closed vessel in the presence of activated silica as catalyst obtained by heating hydrated silica to above 400° C. and then cooling to the polymerization temperature preferably in the absence of moisture. In a preferred embodiment of this invention the polymerization is carried out below 150° C. and above −20° C. and more specifically at room temperatures and at atmospheric pressures.

It has now been discovered, surprisingly so, that heterogeneous polymerization of tetrafluoroethylene at moderate temperatures and low pressures to give high molecular weight polymer can be accomplished by using hydrated silica such as silica gels and such as is found in certain clays by heating in the absence of water. Hydrated silica useful in the process of this invention must contain some water chemically bound to the silica. Although I do not wish to be bound by this explanation, it is believed, that by heating the hydrated silica in the absence of moisture prior to polymerization some of the water chemically adhered to the silica and located at the surface of the silica is removed, leaving behind a surface having catalytically active adsorption sites, e. g. unsaturated valences which may be considered free radicals capable of initiating the polymerization of tetrafluoroethylene. Thus when a tetrafluoroethylene molecule is adsorbed on such an active site is becomes the first member of a growing chain of tetrafluoroethylene molecules. In order to obtain such a polymerization the right combination of adsorbtivity and chemical bond strength is necessary. The bond strength necessary to form catalytically active sites on heating was calculated to be between 20 to 50 kcal. If the bond strength between the water and the materials used in the process of this invention is too high, removing the water may decrease the adsorbtivity or decompose the material used. If the bond strength is too low, it is believed that a Van der Waals type of adsorption will occur which is too low in catalytic activity to induce polymerization. Hydrated silicas are believed to have the right combination of adsorbtivity and bond strength. Compounds having similar properties as the hydrated silica, were also found to have catalytic activity and are described in greater detail hereinbelow.

The silicas to be used in the process of this invention are hydrated silicas which are commercially available as silica gels and clays. Silica gels useful in the process of this invention, however, may be prepared by the acid hydrolysis of ethyl ortho silicates and other methods known to those skilled in the art. Silica gels used as cracking catalysts in the petroleum industry are also useful in the process of this invention. Clays such as Attapulgus clays which contain hydrated silica are commercially available under the name of "Permagel" and "Attasorb."

The activation of hydrated silica to be used as catalysts for the polymerization of tetrafluoroethylene occurs through heating of the silica. Untreated silica gels useful in adsorption have little or no catalytic activity and are often used in the purification of tetrafluoroethylene. When silica gels are heated in a vacuum or in a stream of an inert gas such as nitrogen and in the absence of moisture catalytic activity develops and increases as the temperature of heating increases. The catalytic activity as measured by the initial rate of polymerization increases almost exponentially as the temperature at which the silica is heated is increased from 100° C. to 525° C. This is shown in Figure 1, where initial rate of polymerization is plotted against bakeout temperature. It was however found that although the initial rate of polymerization increases markedly with bake out temperature the total amount polymerized after two hours increases very little for activation or bake out temperatures above 400° C. Although it is possible to use activation temperatures below 400° C. as indicated by the graph, the best results are obtained by heating hydrated silica to above 400° C. The time necessary to achieve activation by heating at 400° C. is illustrated in Figure 2, where initial rate of polymerization at atmospheric pressure is plotted against bake out time. In general it was found that the material was sufficiently active after heating for one hour.

As described hereinabove the activity of the fillers of this invention is believed to be dependent on the adsorptivity and the chemical bond strength by which water is attached to the silica fillers. It is understandable therefore that compounds which will adsorb tetrafluoroethylene and contain chemically bound water of a bond strength within 20 to 50 kcal. will exhibit similar catalytic activity as the hydrated silica when activated. An example of such a compound is hydrated aluminum borate. It is furthermore possible to prepare active fillers by homogeneously combining two compounds which possess either of the two qualifications necessary to create the catalytically active fillers of this invention. As shown in the example hereinbelow active fillers have been prepared by homogeneously admixing compounds containing water chemically combined in the right bond strength range with compounds adsorbing tetrafluoroethylene such as the combination of alumina with phosphoric acid or boric acid, where it is believed that water is removed from the acids on heating the combined filler, thus giving rise to catalytic activity. The activation of these fillers occurs in essentially the same manner as the activation of the silica fillers, described hereinabove. However the hydrated silica are preferred since they show a maximum activity and impart the desired properties of a filler to the resulting molding powder.

The rate of polymerization of tetrafluoroethylene according to the process of this invention is further dependent on the properties that determine the adsorptivity of the catalytically active fillers such as particle size and pore size. Basically the polymerization occurs on all particle sizes of activated filler. However it was found that more tetrafluoroethylene could be polymerized if the particles were small enough to pass a 40 mesh screen. In general it is preferred to use small particle sizes of filler, such as particles passing a 200 mesh screen and smaller in the polymerization of tetrafluoroethylene to obtain more homogeneous mixtures of filler and polymer. In addition to filler particle size the pore size was found to be important. Thus fillers having large pore sizes will give higher yields of polymer. Small pores, it is believed, will plug up with polytetrafluoroethylene, inactivating the area within the pore for further polymerization.

The activation of the filler is preferably carried out in the polymerization vessel so as to decrease the possibility of poisoning the catalytic activity of the filler. It has been found that water, alkali compounds, hydroperoxides, and organic solvents in general poison the catalytic activity of the filler. Inorganic acids and oxygen in general have no poisonous effects and in some instances acts as promoters, e. g. increasing the initial rate of polymerization although not the overall amount polymerized. Upon heating the filler to cause activation, the activated filler should be cooled to below 150° C. and preferably to room temperature prior to the introduction of the tetrafluoroethylene. The overall rate of polymerization varies little in the range of 20° C. to 80° C. but decreases rapidly outside that range. For purposes of convenience of operation room temperature is preferred.

The rate of polymerization of tetrafluoroethylene on activated fillers, as described in the process of this invention, was found to increase with pressure. Polymerization, however, is possible at pressures as low as 1 to 10 mm. mercury. Sufficient adsorption of tetrafluoroethylene occurs at atmospheric pressures to give high polymerization rates so that higher pressures are not required when hydrated silica are used. The overall polymer produced, however, varied only slightly with pressure when hydrated silica is used as the catalytically active filler. Superatmospheric pressures, however, are advantageously applied in the process of this invention to achieve high rates of polymerization in the use of less active fillers described hereinabove.

As can be seen from the examples hereinbelow the activity of the silica is extremely high. Thus activated silicas used in the process of this invention can polymerize up to 13 times their weight of polymer. Due to this high activity of the silica it is possible to include with the active silica of this invention other inactive fillers which do not poison the activity of the silica fillers such as asbestos fibers, glass fibers, etc. Thus it is shown in the example given hereinbelow that activated silica uniformly deposited on asbestos fibers will give filled compositions of polytetrafluoroethylene containing more than 50 percent by weight of polymer.

One of the advantages of this invention lies in the economy and simplicity of the process. Thus a simple closed vessel equipped with a stirrer, an inlet valve and an outlet valve can be used in this vapor phase polymerization of tetrafluoroethylene. Preferably the vessel is equipped with a heating mechanism so as to carry out the activation of the filler in the polymerization vessel. However it is quite possible to heat the filler separately and add it to the reaction vessel at a convenient time if due precaution against poisoning as described hereinabove is exercised. The fact that the reaction rate decreases as reaction temperature increases, introduces an automatic safety factor into the polymerization and prevents runaway reactions causing explosions and other damages.

The invention is further illustrated by the following examples in which all parts given are by weight.

*Example 1.*—Approximately 203 grams of silica gel (commercial grade Type–04), was crushed to 200 mesh particle size and heated in air for several hours at 500° C. to remove all organic impurities collected on the silica gel during the grinding operation. In the absence of oxygen, heating to 400° C. will not remove all traces of organic compounds. The purified filler was removed from the 500° C. oven, cooled in a closed container to room temperature and charged to a 2 liter Pyrex closed polymerization vessel equipped with stirrer and the necessary valves with the minimum exposure to atmospheric moisture. The reaction vessel was immersed in a heating bath and heated at 400° C. while the filler was continuously agitated by the stirrer in a stream of dry nitrogen. After two hours of heating the reaction was cooled and placed in a water bath at 25° C. The polymerization run was then started by introducing a 50:30 mixture of tetrafluoroethylene and nitrogen. After about 20 minutes the nitrogen flow was stopped and pure tetrafluoroethylene was fed to the reactor. The flow of tetrafluoroethylene was regulated so as to give approximately atmospheric pressure in the reactor. After 2.5 hours the reaction was stopped, the vessel was purged with nitrogen and the resulting polymer filler mixture was removed. By weighing the resulting composition it was determined that the final tetrafluoroethylene resin content of the composition was 63% by weight. The resulting white powder was washed with $CCl_4$ and resulted in a free flowing molding powder. The molding powder could be compression molded at 380° C. into tough bars having a flex strength of 4160 p. s. i. and a flexural modulus of $2.68 \times 10^5$ p. s. i. and a tensile strength of 1500 p. s. i. as measured by ASTM methods.

*Example 2.*—The procedure of Example 1 was repeated using two varieties of Attapulgus clay having particles small enough to pass a 325 mesh screen. The following results were obtained:

| Type of Clay | Wt. of Filler Charge, g. | Time of Reaction, h. | Final Weight Percent of Polytetrafluoroethylene |
|---|---|---|---|
| "Attasorb"[1] | 172 | 27 | 79 |
| Do | 220 | 6 | 57 |
| "Permagel"[1] | 68 | 84 | 92.5 |
| Do | 140 | 25.5 | 74 |
| Do | 199 | 3 | 56 |

[1] Commercial product.

*Example 3.*—Similar to Example 1 polymerizations of tetrafluoroethylene were made on mixtures of silica clays and silica gels with asbestos fibers which were physically mixed prior to the activation of the silica compounds. The following results were obtained:

| Type of Silica | Silica to Asbestos[1] Ratio | Mesh Size of Silica | Wt. of Charging | Time of Reaction, h. | Final Weight Percent of Polytetrafluoroethylene |
|---|---|---|---|---|---|
| gel | 3:1 | 200 | 120 | 18 | 39 |
| gel | 5:1 | 200 | 216 | 12 | 38 |
| gel | 2.5:1 | 200 | 280 | 22 | 75 |
| gel | 1:1 | 200 | 200 | 3.5 | 57 |
| gel | 1:2 | 200 | 225 | 19 | 55 |
| clay | 1:1 | 200 | 250 | 30 | 77 |
| clay | 1:1 | 200 | 250 | 6.5 | 59 |

[1] 7-M Canadian fiber.

*Example 4.*—Further vapor phase polymerizations of tetrafluoroethylene were carried out with different fillers described in the table below. The fillers containing a promotor e. g. a compound having water chemically combined in the right bond strength were prepared by admixing an aqueous solution of the promotor with the filler. The concentration of the promotor in the solvent was adjusted so that complete wetting of the filler and homogeneous distribution of the promotor on the filler was possible. All fillers were activated and used in the polymerization of tetrafluoroethylene as described in Example 1. The particle sizes of all fillers were within a range passing a 40 to 80 mesh screen. The rate of polymerization was measured volumetrically by the amount of tetrafluoroethylene used up in polymer formation.

| Type of filler | Percent Promotor | cc. of monomer polymerized/ g. of filler in 1 hour |
|---|---|---|
| Attapulgus Clay | | 84 |
| Aluminum Borate ($2Al_2O_3 \cdot B_2O_3 \cdot 3H_2O$) | | 22.6 |
| Granular Magnesia | | 15 |
| Alumina+$H_3BO_3$ | 10 | 51 |
| Alumina+$H_3PO_4$ | 14 | 58 |
| Ethyl Orthosilicate (hydr.) | | 130 |

The material obtained from the process of this invention is usually in the form of a white free flowing granular product. The filler particles are entirely covered by polytetrafluoroethylene. The powder, however, is improved for molding purposes when washed in carbon tetrachloride. For laboratory purposes washing in a Waring Blendor for 1 minute was found to be sufficient. The finely divided granular material thus obtained can be used in molding procedures similar to those used in the molding processes for polytetrafluoroethylene as described in U. S. Patent 2,400,099.

The ratio of polytetrafluoroethylene to filler may be varied by stopping the addition of tetrafluoroethylene at different reaction intervals. The longer the reaction time the higher the polytetrafluoroethylene content. The ratio of filler to polymer may be controlled in the process of this invention by placing the reactor on a scale and measuring the increase in weight or may also be controlled by metering the tetrafluoroethylene added to the reaction vessel.

Although the process of this invention is primarily concerned with tetrafluoroethylene, alone, it can also be used for polymerization of related monomers and copolymerization of tetrafluoroethylene with other gaseous ethylenically unsaturated compounds such as hexafluoropropylene, perfluorocyclobutene, chlorotrifluoroethylene, vinyl chloride, ethylene, and the like. It is preferred to have an excess of tetrafluoroethylene in these copolymerizations and to initiate such polymerizations with tetrafluoroethylene.

The advantages gained by this invention are found in the process as well as in the product. Thus an economic and safe process for polymerizing tetrafluoroethylene has been discovered. No solvent or liquid medium is required in this process. The polymerization of tetrafluoroethylene is carried out at room temperature and atmospheric pressure. Thus expensive high pressure equipment is not necessary; the polymerization can be carried out in the simplest of equipment as described hereinabove. Since the polymerization reaction has an automatic built-in safety control, any loss of control over the reaction is eliminated. The product obtained from the process of this invention has the advantage of homogeneity over ordinary mixtures of polytetrafluoroethylene and filler. Furthermore, filler and polymer are better bonded to each other. In addition all mixing operations of filler and polymer after polymerization are avoided. In common with other filled compositions the products of this invention have improved properties in flexural modulus, creep, compressive strength and other mechanical properties. The polymers of this invention are useful in the molding of gaskets, bearings, in the extrusion of pipe and in many other applications where high rigidity, high use temperature, and chemical resistance are required.

I claim:

1. A process for polymerizing tetrafluoroethylene comprising heating hydrated silica in an inert substantially moisture free atmosphere to a temperature of at least 400° C. and then admixing with tetrafluoroethylene at a temperature below 150° C. and above −20° C. to cause polymerization of the tetrafluoroethylene.

2. A process for polymerizing tetrafluoroethylene comprising heating hydrated aluminum borate to at least 400° C. in an inert substantially moisture free atmosphere and then admixing with tetrafluoroethylene at a temperature below 150° C. and above −20° C. to cause polymerization of the tetrafluoroethylene.

3. A process for polymerizing tetrafluoroethylene comprising heating a mixture of alumina and phosphoric acid to at least 400° C. in an inert substantially moisture free atmosphere and then admixing with tetrafluoroethylene at a temperature below 150° C. and above −20° C. to cause polymerization of the tetrafluoroethylene.

4. A process for polymerizing tetrafluoroethylene comprising heating hydrated silica to at least 400° C. in the absence of moisture and admixing said silica with tetrafluoroethylene at a temperature below 150° C. and above −20° C. in the absence of moisture to cause polymerization of the tetrafluoroethylene.

5. A process as set forth in claim 4 in which the hydrated silica is in the form of a silica gel.

6. A process as set forth in claim 4 in which the hydrated silica is in the form of Attapulgus clay.

7. A process for preparing filled compositions of polytetrafluoroethylene comprising admixing tetrafluoroethylene and activated hydrated silica in the absence of moisture at a temperature within −20° C. to 150° C., said hydrated silica having been activated by heating to at least 400° C. in the absence of water.

8. A process for preparing filled compositions of polytetrafluoroethylene as set forth in claim 7 in which the ratio of polytetrafluoroethylene to hydrated silica is within 13:1 to 1:5.

9. A process for preparing filled compositions of polytetrafluoroethylene and inorganic fillers, containing at least 20% by weight of hydrated silica, comprising heating the filler to at least 400° C. and cooling to below 150° C. in the absence of water and admixing with tetrafluoroethylene within the range of —20° C. to 150° C. to cause polymerization of the tetrafluoroethylene in the absence of water.

10. A process as set forth in claim 9 wherein the filler comprises silica gel and asbestos fibers.

11. A process as set forth in claim 9 wherein the filler comprises Attapulgus clay and asbestos fibers.

12. A process for polymerizing tetrafluoroethylene comprising heating hydrated silica to at least 400° C. in the absence of water, cooling to room temperature and admixing with tetrafluoroethylene at atmospheric pressures to cause polymerization of the tetrafluoroethylene.

13. A process as set forth in claim 12 in which the hydrated silica is silica gel, having a particle size smaller than 200 microns.

14. A process as set forth in claim 12 in which the hydrated silica is Attapulgus clay having a particle size smaller than 200 microns.

15. A process for polymerizing tetrafluoroethylene which comprises heating an inorganic adsorbent selected from the class consisting of hydrated silica, hydrated aluminium borate, alumina admixed with phosphoric acid and alumina admixed with boric acid in an inert substantially moisture free atmosphere to a temperature of at least 400° C. and thereafter contacting said adsorbent with tetrafluoroethylene at a temperature below 150° C. and above —20° C. and recovering a product of polytetrafluoroethylene and adsorbent.

References Cited in the file of this patent

UNITED STATES PATENTS

| | | |
|---|---|---|
| 2,692,868 | Berry | Oct. 26, 1954 |
| 2,728,732 | Arnett et al. | Dec. 27, 1955 |